United States Patent Office 3,374,097
Patented Mar. 19, 1968

3,374,097
HUMECTANT
Karl Laden, Deerfield, Ill., assignor to The Gillette Company, Boston, Mass., a corporation of Delaware
No Drawing. Original application Dec. 7, 1962, Ser. No. 243,709, now Patent No. 3,235,457, dated Feb. 15, 1966. Divided and this application Apr. 5, 1965, Ser. No. 449,677
4 Claims. (Cl. 99—86)

ABSTRACT OF THE DISCLOSURE

A hygroscopic salt of 2-pyrrolidone-5-carboxylic acid, 1-methyl-2-pyrrolidone-5-carboxylic acid, 2-pyrrolidone-4-methyl-5-carboxylic acid, N-acetyl glycine, N-acetyl alanine, or alpha-acetamido butyric acid as a humectant in food products or in cellulosic materials.

This invention relates to the reduction in moisture-loss tendency of articles of manufacture which tend to lose moisture upon exposure to the atmosphere and pertains more specifically to the use of hygroscopic salts of certain organic carboxylic acids as a humectant for a wide variety of compositions. This is a division of application Ser. No. 243,709, filed Dec. 7, 1962, now U.S. Patent No. 3,235,457, which was in turn a continuation-in-part of application Ser. No. 158,898, filed Dec. 12, 1961, now abandoned.

A great many compositions containing non-aqueous ingredients along with some water or moisture have a tendency to lose moisture when exposed to the atmosphere at ordinary room temperature and an even greater tendency to moisture loss at elevated temperatures. This loss in moisture content frequently has a deleterious effect upon the desired properties of the composition. Moreover, once the moisture has been lost, it is usually very difficult to restore it and to ensure that the original physical properties of the composition are regained.

It has been found that by incorporation in such compositions of at least 2% by weight of a hygroscopic salt of selected carboxylic acids based on the total weight of the composition, the tendency of the composition to lose moisture upon exposure to the atmosphere is markedly reduced. The carboxylic acids, the hygroscopic salts of which are employed in the present invention, are closely related to each other in chemical composition and consist of 2-pyrrolidone-5-carboxylic acid, 1-methyl-2-pyrrolidone-5-carboxylic acid, 2-pyrrolidone-4-methyl-5-carboxylic acid, N-acetyl glycine, α-acetamido butyric acid, and N-acetyl alanine.

Among the hygroscopic salts useful in the present invention are the sodium, potassium, and ammonium salts, as well as the alkanolamine salts, such as salts of mono-, di- and triethanolamine and mono-, di- and triisopropanolamine and mixtures thereof. All of the salts useful in the present invention are hygroscopic to the extent that the pure dry salts exhibit an increase of at least 30% by weight by absorption of moisture from the atmosphere when exposed at room temperature to air at 60% relative humidity for a sufficiently long time to permit equilibrium to be achieved. All of the salts are also water soluble. Furthermore, since the free acid is itself non-hygroscopic, it may readily be stored over long periods of time without any special precautions to keep it sealed from the atmosphere, and it may readily be converted into the desired hygroscopic salt immediately before use.

Although the hygroscopic salts of the present invention must be present in an amount which is at least 2% by weight of the total weight of the composition in order to be effective, there is no definite upper limit on the amount which may be present aside from that imposed by economic or esthetic considerations. Up to 20% by weight or even more may be present under some conditions, but usually best results are obtained when the humectant amounts to 4% to 10% by weight of the total weight of the composition.

The humectant materials of the present invention are useful in any product or composition which has a tendency to lose moisture upon exposure to the atmosphere including such products or compositions as cellulosic materials including regenerated cellulose film, paper products, and tobacco; dentrifice paste; and food products such as baked goods, fudge, chocolate candy, and the like. In the case of food products, because of the salty taste of the salts, the maximum amount which may be used will vary depending upon the type of food: i.e., larger quantities may be used in foods which are normally salty in taste. Of the various salts which may be used in the invention, the sodium salt is preferred both because of its low cost and its known nontoxic properties.

The following specific examples are intended to illustrate more clearly the nature of the present invention, but are not intended as a limitation upon the claims.

Example 1

Different samples of the same unplasticized regenerated cellulose film were immersed in separate 10% aqueous solutions of the sodium salt of 2-pyrrolidone-5-carboxylic acid and of glycerol for 24 hours each and allowed to dry at room temperature. When compared to an untreated sample, both treated samples were found to be soft and considerably less "noisy" when flexed.

Example 2

Two edible cakes were prepared, both having the following recipe, but one containing in addition 5% by weight of the sodium salt of 2-pyrrolidone-5-carboxylic acid:

| | | |
|---|---|---|
| Butter | cup | ½ |
| Sugar | do | 1 |
| Eggs | medium | 2 |
| Flour | cups | 1½ |
| Milk | cup | ½ |
| Baking powder | tablespoon | 1 |
| Vanilla | do | ½ |

The cakes were baked under identical conditions and allowed to stand exposed to the atmosphere side by side for a period of nine days, during which time the moisture loss was determined at intervals, with the following results:

| | Percent Moisture Loss | | Percent Retardation |
|---|---|---|---|
| | PCA [1] Cake | Control Cake | |
| 1 day | 8.2 | 10.5 | 21.9 |
| 3 days | 18.2 | 21.4 | 15.0 |
| 9 days | 24.1 | 2..9 | 16.6 |

[1] Sodium salt of 2-pyrrolidone-5-carboxylic acid.

After nine days' exposure, the cake containing the sodium salt of 2-pyrrolidone-5-carboxylic acid maintained a smooth and attractive surface texture while the other cake had several deep fissures radiating from its center.

Example 3

Two batches of chocolate fudge were prepared, both having the following recipe, except that one of the recipes there was added 5% by weight of the sodium salt of 2-pyrrolidone-5-carboxylic acid.

| | | |
|---|---|---|
| Bitter chocolate | oz | 2 |
| Granulated sugar | cups | 2 |
| Milk | cup | ¾ |
| Corn syrup | tablespoons | 5 |
| Salt | teaspoon | ⅛ |

The two batches of fudge were cooked in the same manner and after cooling were allowed to remain exposed to the atmosphere side by side for a total of nine days, during which period the moisture loss was measured, with the following results:

|  | Percent Moisture Loss | | Percent Retardation |
| --- | --- | --- | --- |
|  | PCA Fudge | Control Fudge | |
| 1 day | 1.2 | 1.8 | 33.3 |
| 3 days | 2.2 | 4.9 | 55.2 |
| 9 days | 5.0 | 7.6 | 34.2 |

Throughout the test the fudge containing the humectant remained very soft and retained a smooth surface while the other batch became hard and appeared progressively more granular at the exposed surface.

Although specific embodiments of the invention have been described herein, it is not intended to limit the invention solely thereto, but to include all of the obvious variations and modifications within the spirit and scope of the appended claims.

What is claimed is:

1. A moisture-retaining product selected from the class consisting of cellulosic materials and food products which tend to lose water upon exposure to the atmosphere having incorporated therein, as an essential humectant therefor, at least 2% by weight, based on the total weight of the product, of at least one member of the class consisting of the hygroscopic salts of 2-pyrrolidone-5-carboxylic acid, 1-methyl-2-pyrrolidone-5-carboxylic acid, 2-pyrrolidone-4-methyl-5-carboxylic acid, N-acetyl glycine, N-acetyl alanine, and alpha-acetamido butyric acid.

2. A moisture-retaining food composition containing at least 2% by weight, based on the total weight of the composition, of a hygroscopic salt of 2-pyrrolidone-5-carboxylic acid.

3. A food composition as claimed in claim 2 in which said salt is the sodium salt.

4. Regenerated cellulose film containing at least 2% by weight, based on the total weight of the film, of a hygroscopic salt of 2-pyrrolidone-5-carboxylic acid.

References Cited

UNITED STATES PATENTS 3,235,457   2/1966   Laden _____ 167—82

LEWIS GOTTS, *Primary Examiner.*

S. K. ROSE, *Assistant Examiner.*

UNITED STATES PATENT OFFICE
CERTIFICATE OF CORRECTION

Patent No. 3,374,097            March 19, 1968

Karl Laden

It is certified that error appears in the above identified patent and that said Letters Patent are hereby corrected as shown below:

Column 2, line 56, "2..9" should read -- 28.9 --; line 64, after "that" insert -- to --.

Signed and sealed this 21st day of October 1969.

(SEAL)
Attest:

Edward M. Fletcher, Jr.            WILLIAM E. SCHUYLER, JR.
Attesting Officer                    Commissioner of Patents